UNITED STATES PATENT OFFICE.

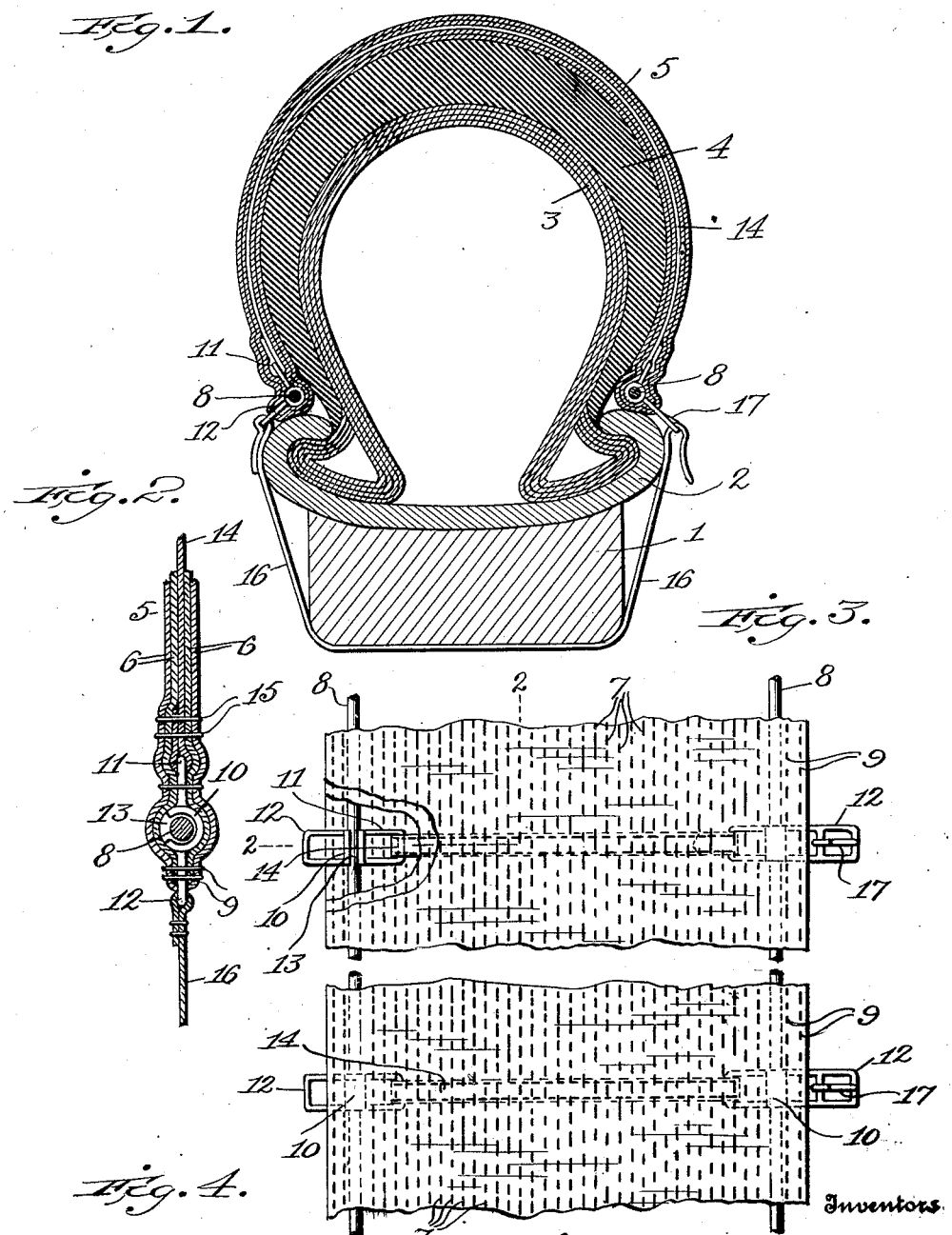

ROGER BOWEN AND WILLIAM F. SWEENEY, OF SOUTHWEST, PENNSYLVANIA.

TIRE-PROTECTOR.

1,109,278. Specification of Letters Patent. Patented Sept. 1, 1914.

Application filed June 10, 1914. Serial No. 844,158.

*To all whom it may concern:*

Be it known that we, ROGER BOWEN and WILLIAM F. SWEENEY, citizens of the United States, and residents of Southwest, in the county of Westmoreland and State of Pennsylvania, have invented certain new and useful Improvements in Tire-Protectors, of which the following is a specification.

The object of the invention is to provide a device that can be mounted upon the ordinary pneumatic tire to protect the same against puncture and wear while under running conditions. In carrying out this object an auxiliary casing or shield is provided that can be readily attached and detached from the rim of the wheel. The casing is composed, primarily, of layers of pitched canvas sewed firmly together and shaped so as to fit snugly over the tread of the ordinary tire, and attached at intervals to the edges of this casing are strips that can be buckled under the felly of the wheel to hold the casing in place.

The invention consists in the novel construction, combination and arrangement of parts, hereinafter described, pointed out in the appended claims, and illustrated in the accompanying drawings.

In the drawings, in which similar reference characters designate corresponding parts, Figure 1 is a cross-sectional view of a pneumatic tire with the protector mounted thereon. Fig. 2 is a sectional view on the lines 2—2 of Fig. 3. Fig. 3 is a plan view of a section of the protector, part being cut away to show one of the strap buckles. Fig. 4 is a similar view with no part cut away.

As shown in Fig. 1 of the drawings, the felly 1, the rim 2, the outer tube 3, and the tread 4 form part of an ordinary pneumatic tire. Over the tread 4 is fitted the auxiliary protector or shield 5 that embodies the present invention.

The body part of the auxiliary protector or shield 5 is formed of four plies of canvas firmly secured together by the longitudinal stitching 7. The canvas is thoroughly impregnated with pitch, or other suitable material, to give density to the fabric so that it will withstand wear and also to render it waterproof. The plies of canvas are so patterned and stitched together and the body of the shield so shaped as to fit over the tread of the pneumatic tire.

Extending along each edge of the protector is the wire or hoop 8, the edges of the canvas plies extending over the same, two on each side, and joined together by the two lines of stitching 9 outside of the wire. The wires, or hoops 8, serve to hold the protector to its shape and fitting in the recesses between the adjacent edges of the rim 2 and the tread 4 and also serve to hold the protector in place on the pneumatic tire.

At intervals along each wire or hoop 8 are placed the cylindrical clips 10. Projecting from opposite sides of each clip are the loops 11 and 12. The clip is recessed, as at 13, to admit the wire 8. The normal inner diameter of the cylindrical clip is slightly greater than the diameter of the wire so that the clip can bend when the wire 8 presses into the recess at the edges of the rim 2 and the tread 4, as shown in Fig. 1.

The inner loops 11 of two clips on opposite edges of the shield are connected by the strap 14 extending transversely across the shield between the two inner and the two outer plies 6, where it is held by the longitudinal stitching 7, the ends of the strap being secured to the loops 11 by stitching, as at 15. In the outer loop 12 of each clip 10 on one of the wires 8 is secured the strap 16 adapted to pass around the felly 1 to the outer loop 12 of the clip 10 on the opposite side, the loop of the clip on the opposite side being provided with a tongue 17 to engage the strap. As the strap 16 is connected directly with the strap 14 through the clips and loops joining their ends, the strain of the strap 16 is taken up by the strap 14 so that there will be no direct strain upon fabric plies of the shield to distort the latter. By means of the several straps 16 passing around the felly 1 the shield will be firmly held in place upon the pneumatic tire.

In mounting the protector or shield, the pneumatic tire is deflated so that an edge of the protector can be forced over the wire. After the shield has been placed in position over the pneumatic tire, the latter is inflated and the straps 16 are drawn tight around the felly and secured in place.

Having thus described our invention, what we claim and desire to secure by Letters Patent is:

1. In a tire protector, a fabric shield to fit the tread of the tire, wires extending along the edges of the shield, straps extending transversely across the shield and connected at their ends with said wires, and holding straps adapted to extend between said wires around the felly of the wheel.

2. In a tire protector, a shield to fit the tread of the tire comprising plies of fabric secured together by stitching, wires extending along the edges of the shield and stitched between the edges of the plies, restraining straps incorporated in the fabric material of the shield and extending transversely across the same with their ends secured to said wires, holding straps to extend inside of the felly of the wheel, and means for connecting the ends of the holding straps to the ends of the restraining straps.

3. In a tire protector, a fabric shield to fit the tread of the tire, wires extending along the edges of the shield, clips placed at intervals along each wire, restraining straps extending transversely across the shield and connected at their ends with said clips, and holding straps adapted to pass inside of the felly of the wheel from the clips on one side to the clips on the other side.

4. In a tire protector, a fabric shield to fit the tread of the tire, wires extending along the edges of the shield, clips placed at intervals along each wire, each clip comprising a recessed cylindrical body part to receive the wire and loops extending from opposite sides of the body part, restraining straps extending transversely across the shield and connecting the inner loops of opposite clips, and holding straps to pass inside of the felly to connect the outer loops of opposite clips.

In testimony whereof we hereunto affix our signatures in the presence of two witnesses.

ROGER BOWEN.
WILLIAM F. SWEENEY.

Witnesses:
EDW. M. KENNEDY,
EDW. P. DORAN.